(12) United States Patent
Heims et al.

(10) Patent No.: US 9,303,792 B2
(45) Date of Patent: Apr. 5, 2016

(54) PIPE BLOCK SUPPORT

(76) Inventors: Tracy M Heims, Seattle, WA (US);
Kenichi Shibata, Yokohama (JP)

( * ) Notice: Subject to any disclaimer, the term of this patent is extended or adjusted under 35 U.S.C. 154(b) by 407 days.

(21) Appl. No.: 13/556,159

(22) Filed: Jul. 23, 2012

(65) Prior Publication Data

US 2014/0020224 A1    Jan. 23, 2014

(51) Int. Cl.
*F16L 3/24* (2006.01)
*H02G 3/32* (2006.01)

(52) U.S. Cl.
CPC .. *F16L 3/24* (2013.01); *H02G 3/32* (2013.01); *Y10T 29/49826* (2015.01)

(58) Field of Classification Search
CPC ............. F16L 3/02; F16L 3/12; F16L 3/1207; F16L 3/127; F16L 3/24; F16L 3/221; F24F 13/0254
USPC ................... 248/74.2, 74.1, 74.3, 49, 346.01; 248/346.05, 346.03; 29/525.01, 525.02, 29/525.03, 525.04
See application file for complete search history.

(56) References Cited

U.S. PATENT DOCUMENTS

| | | | | |
|---|---|---|---|---|
| 2,846,169 A * | 8/1958 | Sullivan | | 248/62 |
| 3,226,069 A * | 12/1965 | Clarke | | 248/73 |
| 3,486,726 A * | 12/1969 | Kindorf et al. | | 248/72 |
| 3,554,474 A * | 1/1971 | Davies | | 248/49 |
| 3,632,069 A * | 1/1972 | Thayer et al. | | 248/56 |
| 3,632,071 A * | 1/1972 | Cameron et al. | | 248/74.3 |
| 3,968,323 A * | 7/1976 | Blanchet | | 174/135 |
| 3,980,262 A * | 9/1976 | Lee | | 248/65 |
| 4,044,428 A * | 8/1977 | Kowalski | | 24/16 R |
| 4,119,285 A * | 10/1978 | Bisping et al. | | 248/72 |
| 4,202,090 A * | 5/1980 | Cook | | 29/417 |
| 4,318,252 A * | 3/1982 | Janson | | 52/39 |
| 4,502,653 A * | 3/1985 | Curtis, Jr. | | 248/55 |
| D280,597 S * | 9/1985 | Fortsch | | D8/396 |
| 4,542,871 A * | 9/1985 | Fortsch | | 248/73 |
| 5,346,165 A * | 9/1994 | Frean et al. | | 248/146 |
| 5,653,412 A * | 8/1997 | Martorano et al. | | 248/222.11 |
| 5,855,342 A * | 1/1999 | Hawkins et al. | | 248/68.1 |
| 5,893,538 A * | 4/1999 | Onishi et al. | | 248/65 |
| 6,105,216 A * | 8/2000 | Opperthauser | | 24/459 |
| 6,305,650 B1 * | 10/2001 | Hawkins et al. | | 248/68.1 |
| 6,446,915 B1 * | 9/2002 | Ismert | | 248/68.1 |
| 6,679,461 B1 * | 1/2004 | Hawkins | | 248/74.2 |
| 6,994,300 B2 * | 2/2006 | Labeirie et al. | | 248/70 |
| 7,278,613 B2 * | 10/2007 | Roy | | 248/49 |
| 7,377,472 B2 * | 5/2008 | Brown et al. | | 248/74.1 |
| 7,591,442 B2 * | 9/2009 | Dinh et al. | | 248/73 |
| 7,735,270 B2 * | 6/2010 | Olle et al. | | 52/167.9 |
| 7,861,981 B2 * | 1/2011 | Olver | | 248/68.1 |
| 7,913,957 B2 * | 3/2011 | Nelson et al. | | 248/71 |
| 7,922,130 B2 * | 4/2011 | Hawkins | | 248/74.2 |

(Continued)

*Primary Examiner* — Essama Omgba
(74) *Attorney, Agent, or Firm* — Tracy M. Heims; Apex Juris, pllc

(57) ABSTRACT

A connector for securing a pipe or conduit to a pipe support where the pipe support has at least one channel and two rails that run parallel to the channel and where the connector has an upper pipe connector portion having a platform and a fastening means for securing the pipe to the platform; a middle portion that provides a gap between the upper portion and a lower pipe support connecting portion and where the lower pipe support connecting portion has at least two legs that are integrally formed with the upper pipe connector portion and the two feet at a bottom portion of the legs has two channels formed by the feet and legs whereby the rails of the pipe support are inserted into and secured within the channels.

20 Claims, 22 Drawing Sheets

(56) References Cited

U.S. PATENT DOCUMENTS

| | | | |
|---|---|---|---|
| 8,091,839 B2* | 1/2012 | Whipple et al. | 248/67.7 |
| 8,104,731 B2* | 1/2012 | Faucher et al. | 248/343 |
| 8,141,826 B1* | 3/2012 | Gallardo et al. | 248/68.1 |
| 8,181,916 B2* | 5/2012 | Azuma et al. | 248/68.1 |
| 8,540,194 B2* | 9/2013 | Azuma et al. | 248/68.1 |
| 2005/0211847 A1* | 9/2005 | Pattie et al. | 244/129.1 |
| 2006/0131465 A1* | 6/2006 | Lynch et al. | 248/68.1 |
| 2007/0022676 A1* | 2/2007 | Krovats | 52/167.9 |
| 2007/0120036 A1* | 5/2007 | Olle et al. | 248/615 |
| 2009/0272856 A1* | 11/2009 | Azuma et al. | 248/73 |
| 2010/0308181 A1* | 12/2010 | Azuma et al. | 248/49 |
| 2012/0119037 A1* | 5/2012 | Azuma et al. | 248/65 |
| 2014/0020224 A1* | 1/2014 | Heims et al. | 29/428 |

\* cited by examiner

PIPE BLOCK SUPPORT

BACKGROUND OF THE INVENTION

1. Field of the Invention

This invention relates to pipe supports and to pipe block connecting apparatus that are designed and used to secure pipe to the pipe supports. More particularly, the invention relates to an easily usable connecting apparatus designed to simplify affixing the connecting apparatus to a pipe support block and to then simplify affixing a pipe to the connecting apparatus, thus by way of the connecting apparatus affixing the pipe to the pipe support block.

2. Description of the Prior Art

The present invention deals with products in the field of construction, and specifically in the area of configuration and organization of pipe. Even more specifically the invention deals with a product and method of securing piping as it runs across a roof top. However, the product can be used for affixing pipe to supports and pipe configuration anywhere it may be required.

Typically when a commercial building is constructed it tends to have a flat roof. The reasons for this are numerous, including the fact that many items are installed on the roof top. Included in these installations there generally are a large number of pipes or conduit. These pipes may carry electricity, oil, gas, water, air, etc. and generally it is required that these pipes be elevated up and off the roofing surface. Again, the reasons for this requirement are numerous but typically the reasons involve safety issues. For example, if the pipe or conduit carries electrical cables it is imperative that these be elevated up and off the roof surface in case the roof surface has standing water. Obviously it could be possible for the water to find a hole or leak in the conduit and this could in turn lead to shorts in the electrical system or in a worst case scenario even complete failure in the system.

Historically the methods or products required for this elevation has not been codified or set out by any rule making body. Thus, engineers and architects typically do not specify what products to use and installers then will generally use whatever is most cost efficient and available on the job. Contractors will use whatever remaining 4×4s exist on the site, combined with metal strapping that is run up and over the conduit and then simply screwed in place. The wooden 4×4s are typically cut to size, the pipes are set across the blocks, or sleepers, and then the pipes are strapped down using metal strapping and screws.

There are numerous problems and issues that result when using these products with this method and procedure. First, the wooden blocks are not uniform in height. Because the installers use scraps from the job site there are usually differences in the block height. This can cause stress points and thus may cause issues with the pipe or conduit. Secondly, the blocks rot and decay. Because it is just wood it is of course susceptible to the elements and the blocks tend to weather, rot and eventually fall apart. Again, this causes stress points and compromises the conduit or piping. Next, it is extremely time consuming and inefficient. The block is heavy and usually is not uniform in size. In order to cut the block to size the installer must have the proper saw to cut to length. Next, to secure the pipe to the block the installer must have metal strapping and screws. The strapping must be measured to fit each pipe, cut to size, folded over the pipe and then screwed into the wooden block. Additionally, when the wood begins to rot the screws tend to pull free, again compromising the connection to the block. Finally, using the wooden blocks and strapping is aesthetically unappealing.

In order to resolve these issues a number of companies created and produce a variety of products to replace the wooden block. However, most products currently available are a large footprint of plastic or rubber that utilizes a metal channel, or strut. Then a hanger or some other device is used to secure the pipe to the block. It has recently been discovered that when these products are used with solar panels electrolysis, deterioration, corrosion and decay occurs and destroys the metal clamps and metal channels. Electrolysis is a process by which an electric current is passed through a substance to effect a chemical change. The chemical change is often oxidation or reduction. Electrolysis, deterioration and corrosion all cause the block to conduit connection to be compromised.

In a typical solar configuration solar panels are placed on the roof and conduit then runs from the panels, across the roof and into an inverter. The pipe supports are used across the roof surface to elevate the conduit throughout the run to the inverter. However, the power running through the lines is direct current (DC). It has recently been discovered that the DC power, combined with outside moisture is causing electrolysis and corrosion to occur at the connection points between the metal channel and the metal struts and the metal is decaying and failing, thus compromising the connection point and again causing a weakness in the structure will compromise the conduit.

OBJECTS AND SUMMARY OF THE INVENTION

In view of the foregoing it is an object of the present invention to provide a pipe support block and a connecting apparatus that will securely fasten a pipe to the pipe support block, that is easily, quickly and efficiently installable. Ideally this locking connector is made entirely of plastic, ABS, AES, nylon or any other non-metallic material to avoid the occurrence of electrolysis and corrosion. However, it may also be made of metallic materials for use in other fields or applications where the occurrence of electrolysis and corrosion is not an issue.

It is another object of the present invention to provide a connector, either of non-metallic or metallic material that is easily installable to a block product that utilizes either an all plastic channel or a metal channel.

It is still another object of the present invention to provide a connector that can use differing means to secure the pipe to the fastener.

The present invention achieves these objects and other objects that become evident from the following detailed description of the preferred embodiments of the invention by providing an improved pipe block connector that is easily mountable to both a pipe support and to a pipe or conduit.

BRIEF DESCRIPTION OF THE DRAWINGS

FIG. 3(b) is an elevated view of the first embodiment of the block connector with shoulders and U-shaped feet utilizing an attached zip tie, or cable tie through side hole specifically designed to receive and lock the zip tie into place, with a piece of pipe attached;

DETAILED DESCRIPTION OF THE EMBODIMENTS

Figure 1:
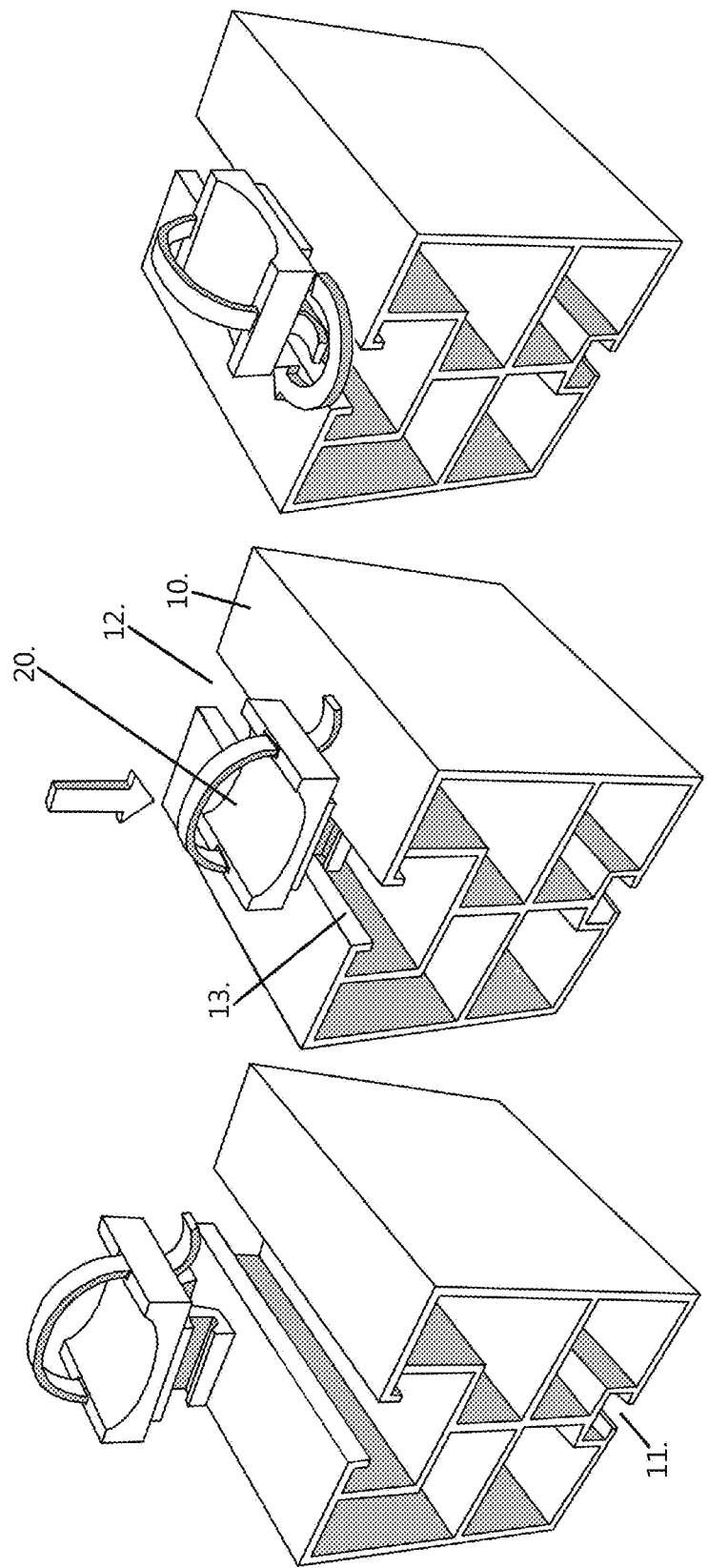
FIG. 1 is an elevated view of a first embodiment of the block connector of the present invention showing the progression of connection, beginning prior to insertion into the block, during and finally after insertion into the block pipe support.

The invention will now be described in detail with reference to the attached drawings. As described above in the summary there is a need for a pipe support block that contains no metallic substance. Therefore, the present invention utilizes a non-metallic block 10 made of nylon, plastic, ABS/AES or other non-metallic materials as shown in FIG. 1. This block is described more completely in U.S. Pat. No. 8,181,916 B2. The block is basically square in size and can be of varying height, width and length. The block features a dual channel configuration. The first channel 11 is usually of a standard ⅜ bolt size whereas the second connector channel 12 is of the typical strut size that is approximately 1.5 inches wide by 1 inch deep. However, it is noted that these measurements are not restrictive and that they may be of any other configuration. The present invention deals primarily with a block connector apparatus 20 designed to easily lock into the connector channel 12.

FIG. 1 is an elevated view of the invention showing the installation steps to securely place a block connector 20 into channel 12. As can be seen in FIG. 1, connector channel 12 is basically square in design with an open, channel, or slotted top. Unique to the channel or slot is a short extending rail 13 that runs the entire length of the block 10. This rail 13 is important as it provides a basis to which a standard metal hanger may connect. However, it also provides a solid connection rail for the present invention. In fact, in the present invention the connection portion of the block connector 20 extends further along the rail with a matingly locking section, thus providing a more solid connection and base for block connector 20.

In a first embodiment the block connector 20 is inserted into channel 12, is twisted and then locks in place, as is shown in FIG. 1. This locking occurs as a result of the unique design of block connector 20, more fully described below. In this first embodiment, shown in FIGS. 2, 3 and 3(b), the block connector 20 is designed with an upper saddle, or platform 21. This saddle 21 provides a seat for a pipe 30 to rest therein. This saddle 21 can be either affixed to the lower portion 50 of the block connector 20 or it can be formed integrally with lower portion 50 of the block connector 20. In the preferred embodiment the platform 21 runs perpendicular to channel 12, however, it can run either perpendicular to channel 12 or parallel with channel 12.

Figure 2:
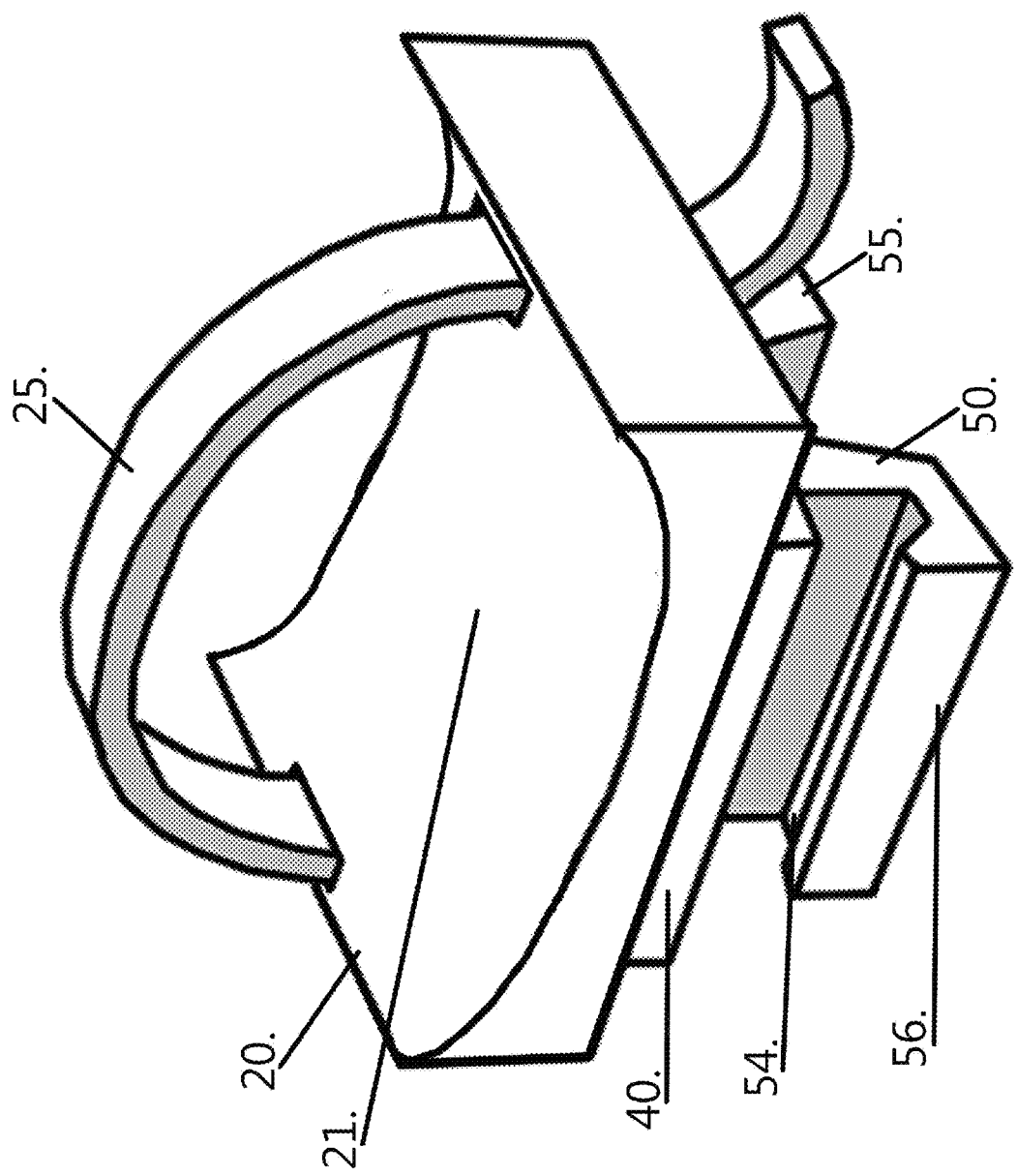
FIG. 2 is an elevated view of the first embodiment of the block connector with U-shaped feet utilizing an attached zip tie, or cable tie through a side hole specifically designed to receive and lock the zip tie into place.
Figure 3:
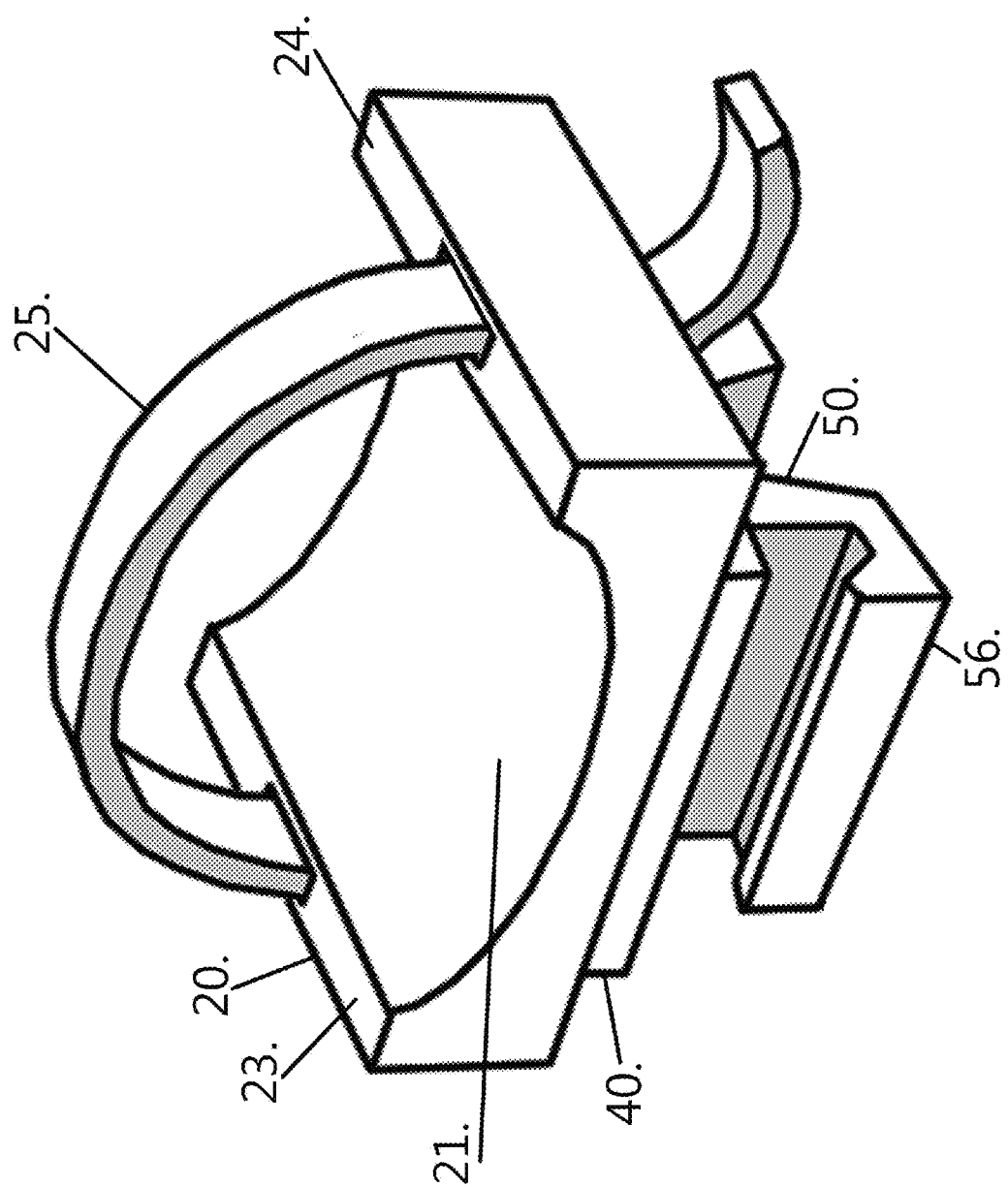
FIG. 3 is an elevated view of the first embodiment of the block connector with shoulders and U-shaped feet utilizing an attached zip tie, or cable tie through side hole specifically designed to receive and lock the zip tie into place.
Figure 3:
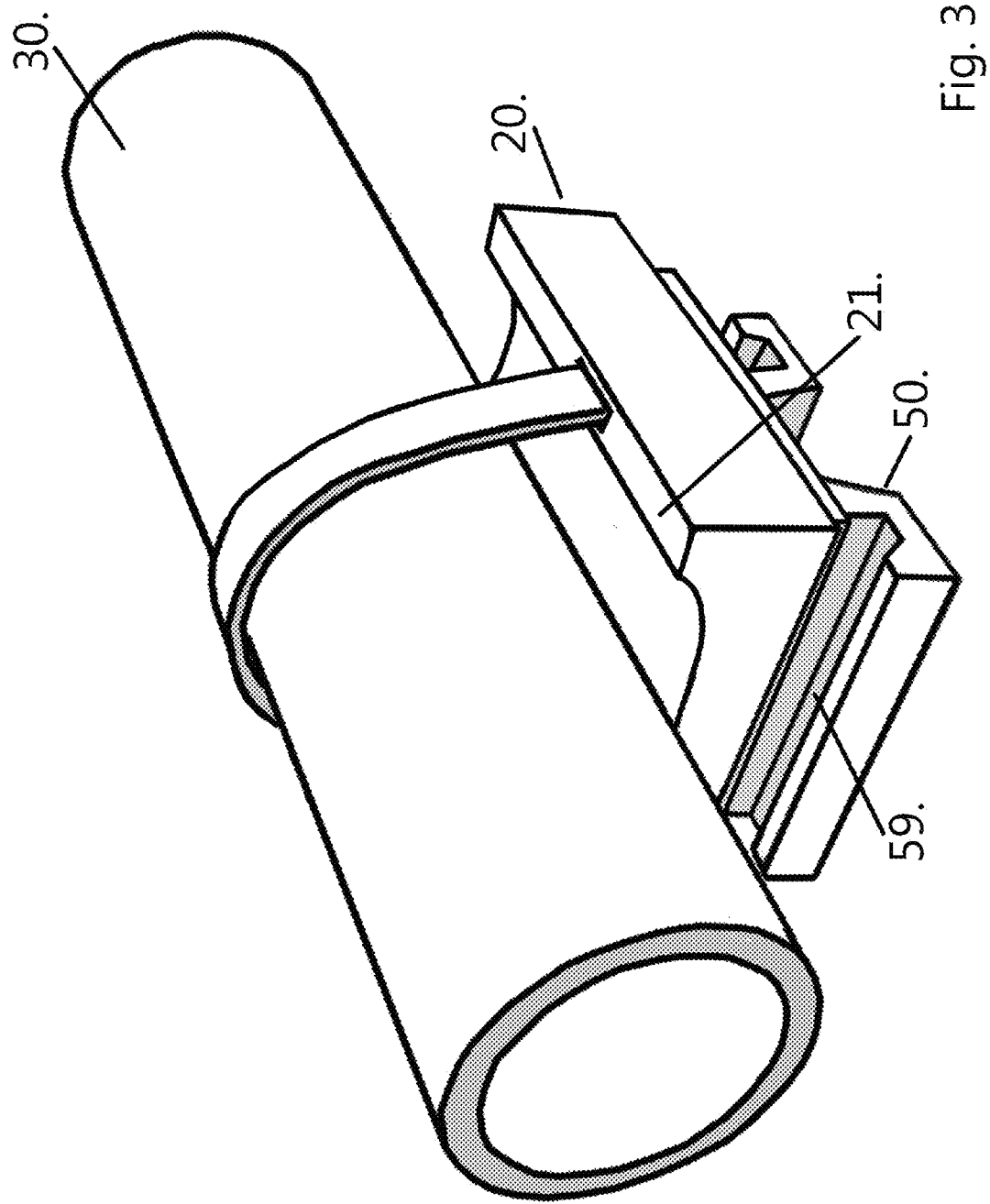

First will be described the connecting means by which the pipe is attached or secured to the block connector 20. In the first embodiment, shown in FIGS. 2, 3, 8, 15, the saddle 21 runs perpendicular to the channel 12. Also in this embodiment the block connector 20 can be either bordered on both sides by shoulders 23, 24, as shown in FIGS. 3 and 3(b), or it can have no shoulders, as shown in FIG. 2. This saddle can vary in size depending on the diameter of the pipe and could also simply be a flat surface. In the shouldered design of FIG. 3, on one of these shoulders there is a strap 25 that is permanently affixed to shoulder 23. This strap 25 can be similar to a zip tie, cable tie or any other strapping mechanism that has a means for securing it to a second end. In this embodiment there is a slot 26 extending through shoulder 24. This slot 26 has an inner channel that accepts the zip tie strap 25 such that strap 25 is brought up and over pipe 30 and then strap 25 is inserted through slot 26. Strap 25 is then pulled down through slot 26 to secure pipe 30 to block connector 20. Strap 25 and slot 26 interact with each other just as a zip tie or cable tie would interact. These ties can be made of nylon, plastic, metal, a combination of these or any other flexible yet break resistant material. Obviously this same orientation and configuration can be made in the embodiment shown in FIG. 2 where there are no shoulders, but simply a saddle.

Figure 4:
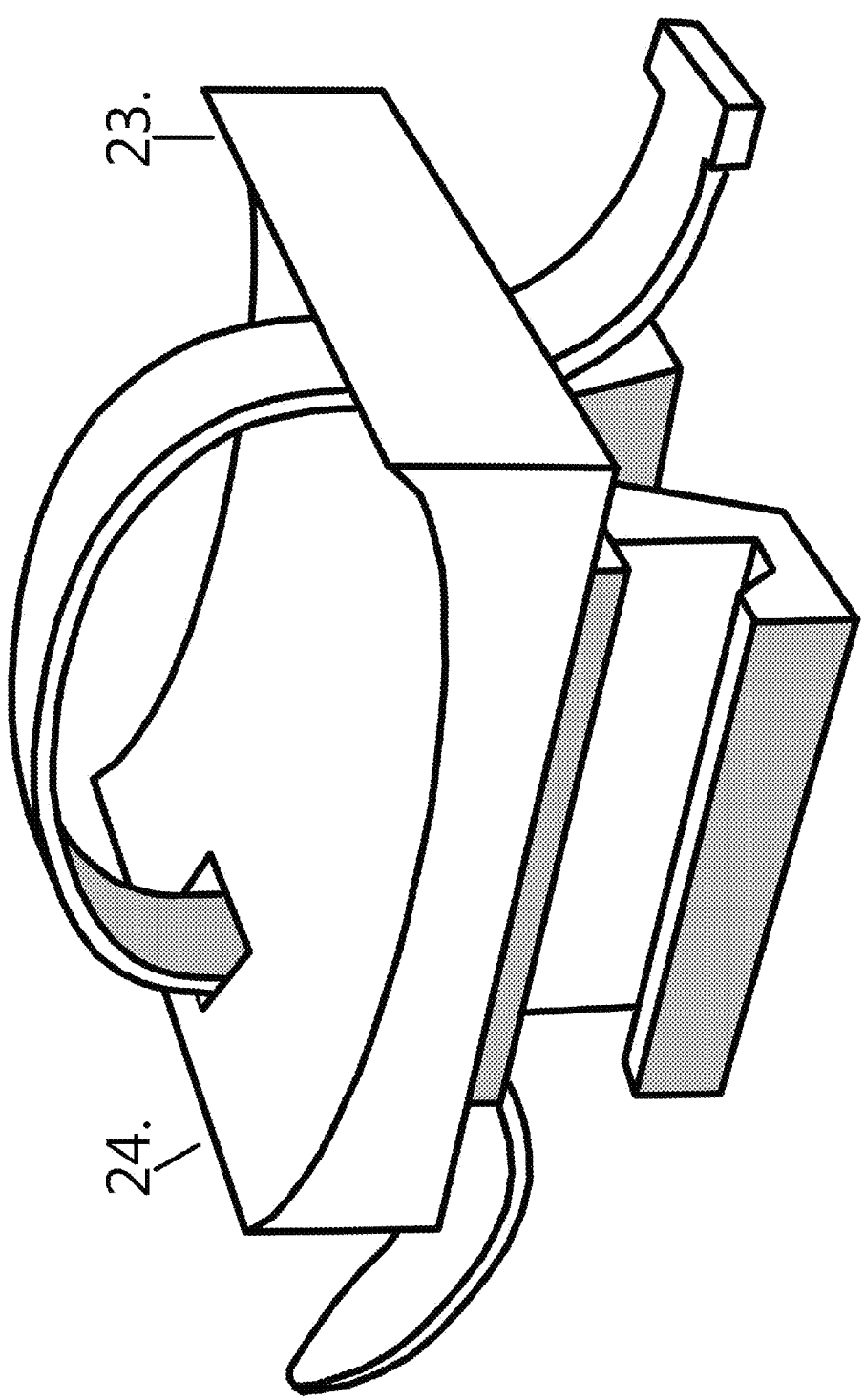
FIG. 4 is an elevated side view of a second embodiment of the block connector without the shoulders and with U-shaped feet utilizing a zip tie through two holes where one hole is configured to receive an end of the zip tie such that the end will not slide through the hole and the other hole has an internal zip tie ratcheting configuration designed to receive and lock the zip tie other end into place.
Figure 5:
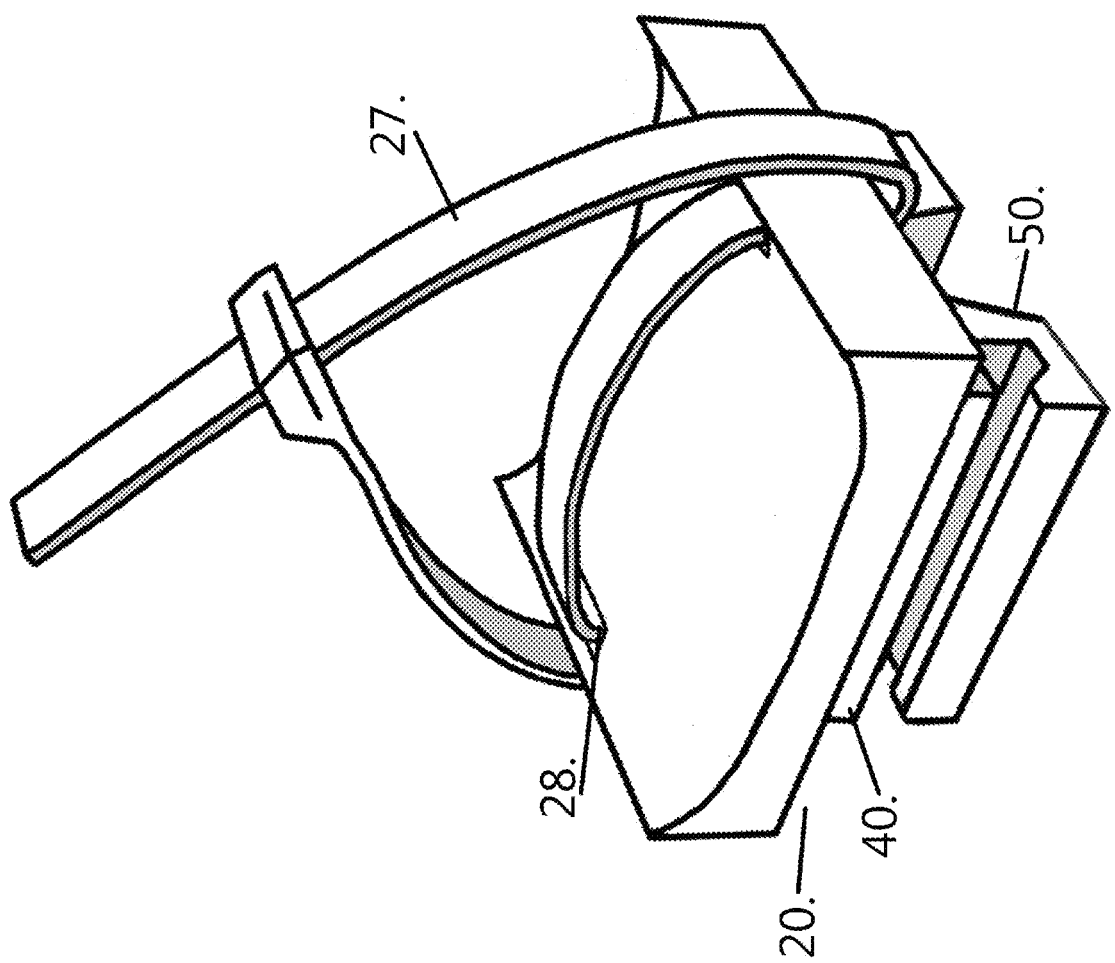
FIG. 5 is an elevated view of a third embodiment of the block connector where the connector simply has a hole on each side of the connector and in this configuration the connector has no shoulders and U-shaped feet; further a zip tie is inserted through the two opposing side holes and is then arranged such that it will lock using its own locking mechanism.
Figure 6:
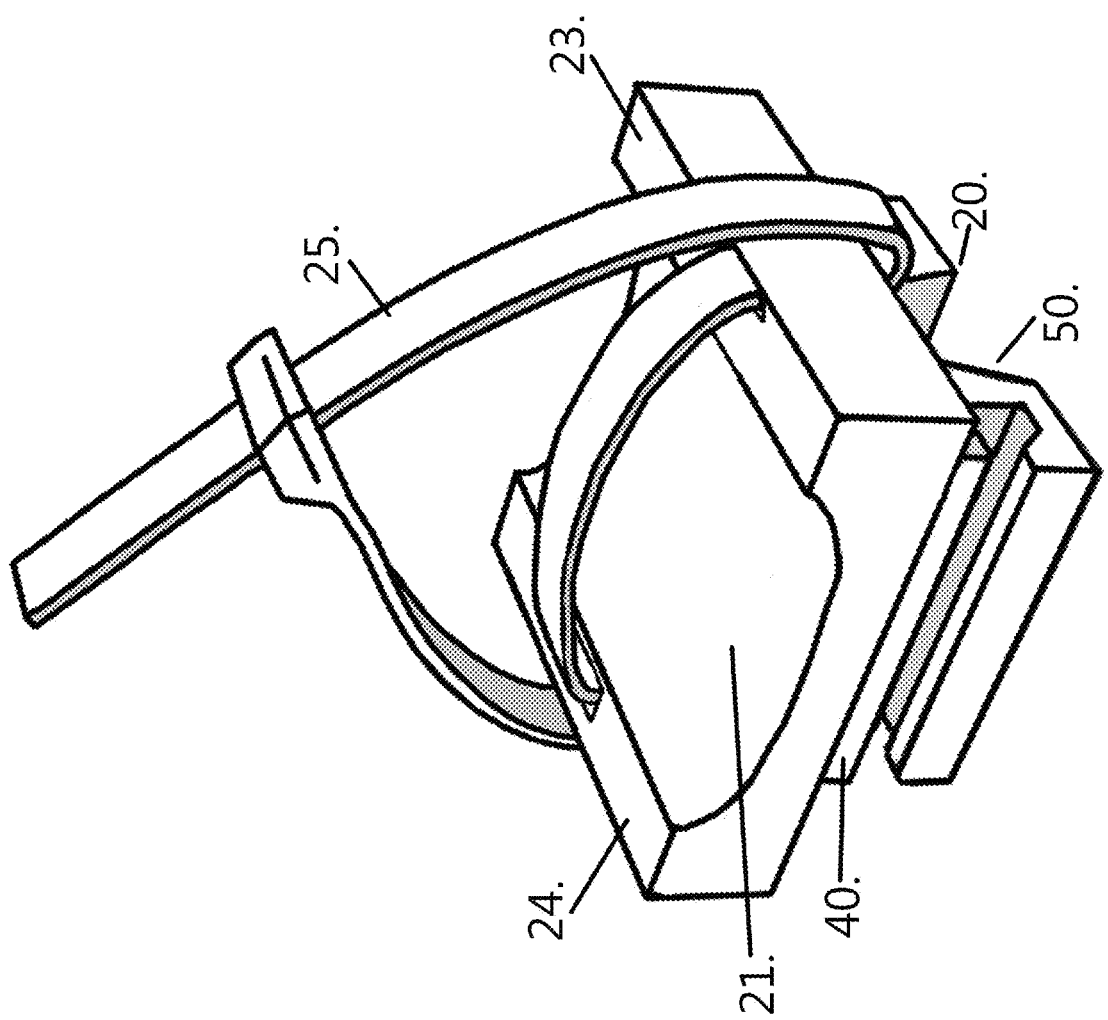
FIG. 6 is an elevated view of the third embodiment of the block connector with shoulders, U-shaped feet and a zip tie through the two side holes.

In a second embodiment the connector can again either have or not have shoulders 23, 24. FIG. 4 shows this embodiment configuration without shoulders. In this second embodiment with shoulders, shoulders 23, 24 would have two slots 28, 29 with only one slot configured to receive and lock a standard zip tie strap into place. The second slot 28 would be just a simple, clean slot with an opening large enough to receive a standard zip tie 27 but smaller than the locking mechanism end of the zip tie 27 in order to prevent the tie from sliding entirely through the hole, thus securing the tie in place. In this configuration the zip tie 27 is fed through the second slot 28 such that the locking end of the zip tie 27 abuts against the lower portion of shoulder 23, thus preventing the zip tie 27 from passing entirely through the slot. The free end is then wrapped up and over pipe 30 and is then inserted down and through slot 26. It is then pulled down to securely affix pipe 30 to block connector 20. This could also be configured as shown in FIG. 4 where the platform has no shoulders but still has the holes therethrough.

Alternatively, an even simpler configuration is possible in a third embodiment where shoulders 23, 24, or plain saddle, have two open slots. In this embodiment again a standard zip tie 27 could be utilized. As shown in FIGS. 5, 6, 7, 9, 10, 11, 12, 13, 14, and 16 zip tie 27 is inserted up and through first clean slot 28, it is then brought up and over pipe 30, fed down through second clean slot 29, once through clean slot 29 it is brought back up along the side of shoulder 23 and continues to be brought up to the top of pipe 30. The opposite locking end strap portion extends up along the side of shoulder 24 and over the top of pipe 30 where it is then matingly joined with the opposite end of zip tie 27. The zip tie 27 is pulled taught and thus the pipe is securely fastened on top of block connector 20. These figures show the basic embodiments with slight variation, particularly with or without shoulders, and with a V-shaped or U-shaped channel in a foot portion, described below.

Block connector 20 is uniquely designed to connect and lock in place to block 10. FIGS. 1, 2 and 3 show differing views of the first embodiment where the strap 25 is directly connected to shoulder 23, or saddle and where the block connector 20 is oriented so that the pipe 30 lays perpendicular to channel 12. Although this description is set out utilizing the first embodiment with the permanently connected strap it is anticipated that this same configuration and design can be used with any strap configuration as set out hereinabove.

FIGS. 2, 3 and 3(*b*) show the block connector 20 when separated from the block 10. The block connector 20 of this embodiment includes the upper portion 22 as described above with the permanently affixed strapping, a middle portion 40 and lower portion 50. It is envisioned that the pipe can be affixed to the block connector 20 either prior to or after affixing block connector 20 to the block 10.

Middle portion 40 is necessary as it provides a firm base for affixing the block connector to the block. Additionally, middle portion 40 provides the required space to either attach zip tie 27 or zip strap 25. Middle portion 40 is either permanently affixed to upper portion 22 and lower portion 50 or it is a singley formed piece of material. That is, upper portion, middle portion and lower portion are made of one, uniform piece of material.

Figure 7:
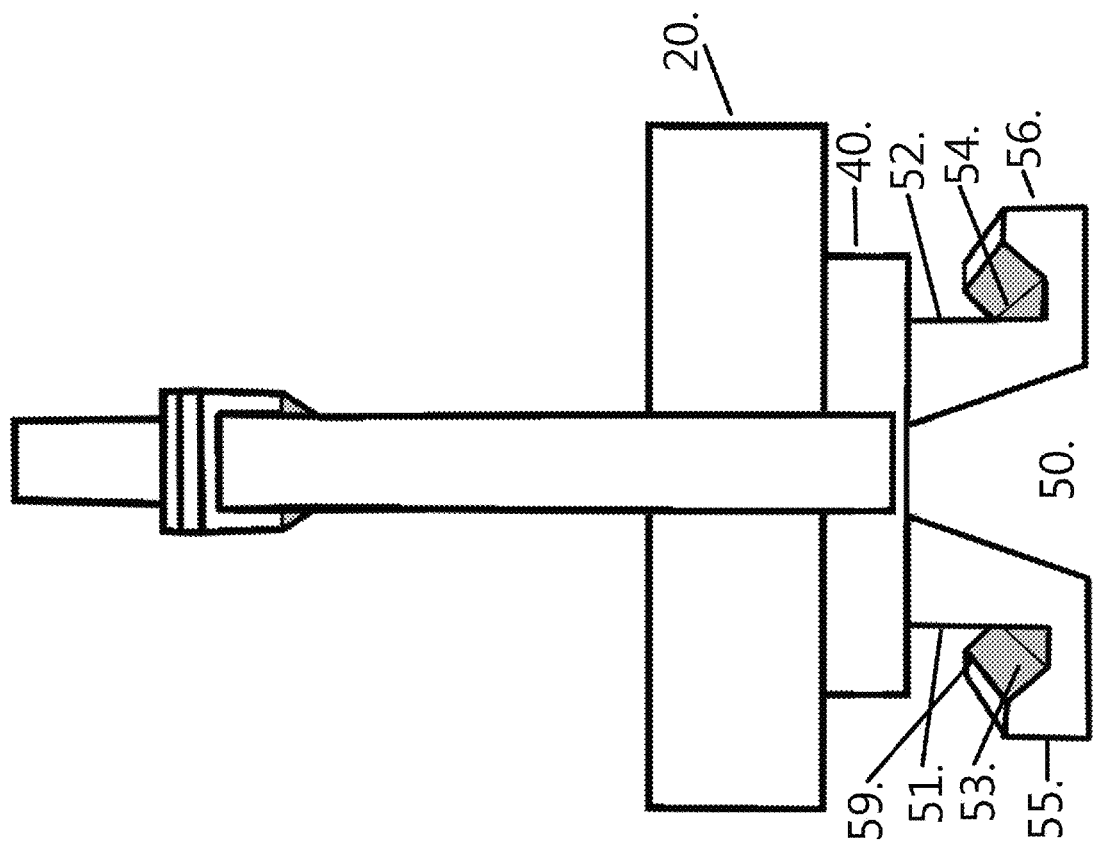
FIG. 7 is a side view of the third embodiment of the block connector with U-shaped feet and with the zip tie run through and connected.
Figure 8:
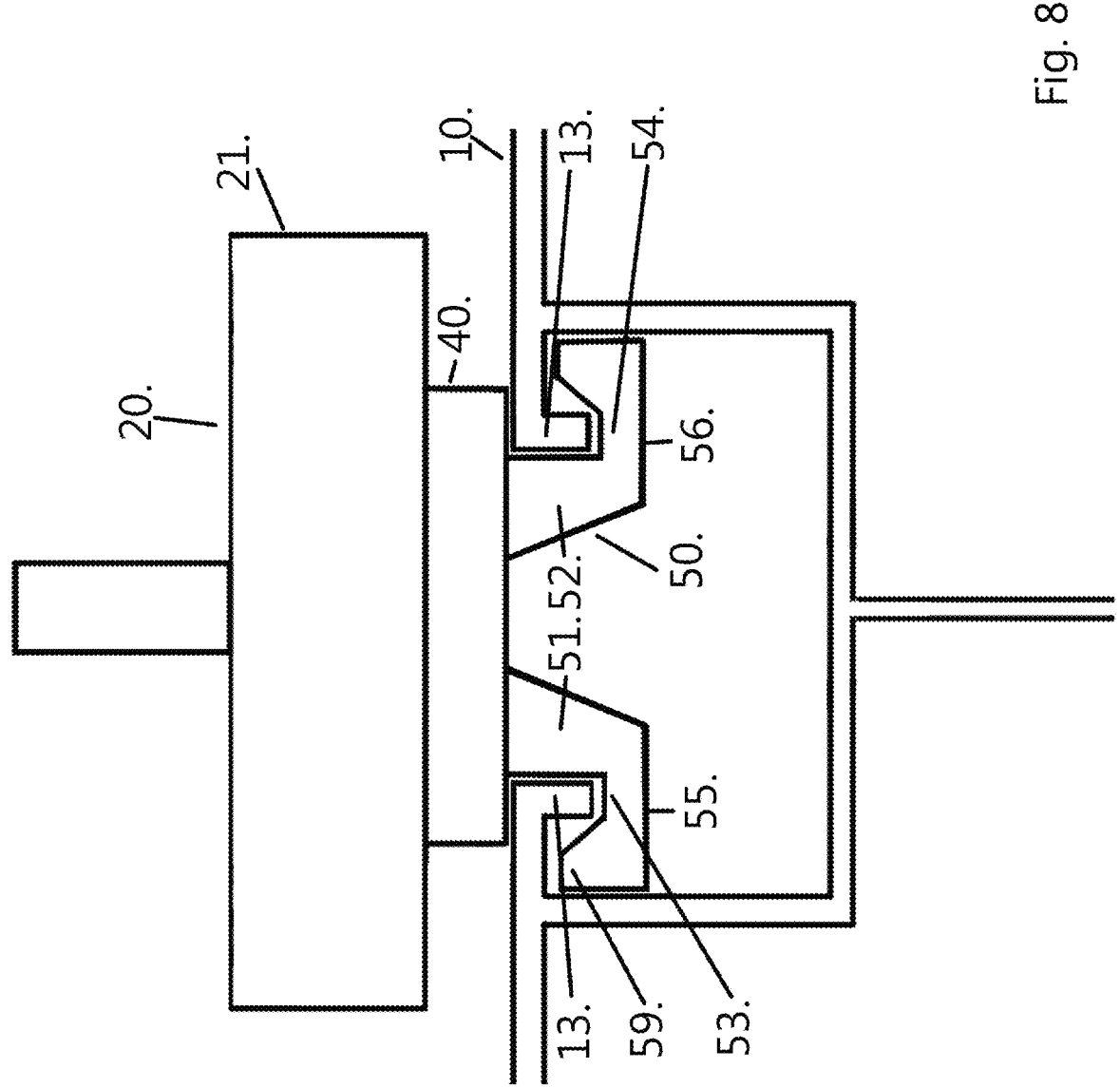
FIG. 8 is a side view of the first embodiment of the block connector with U-shaped feet after connection to the block, utilizing a zip tie that is permanently affixed to the connector.
Figure 9:
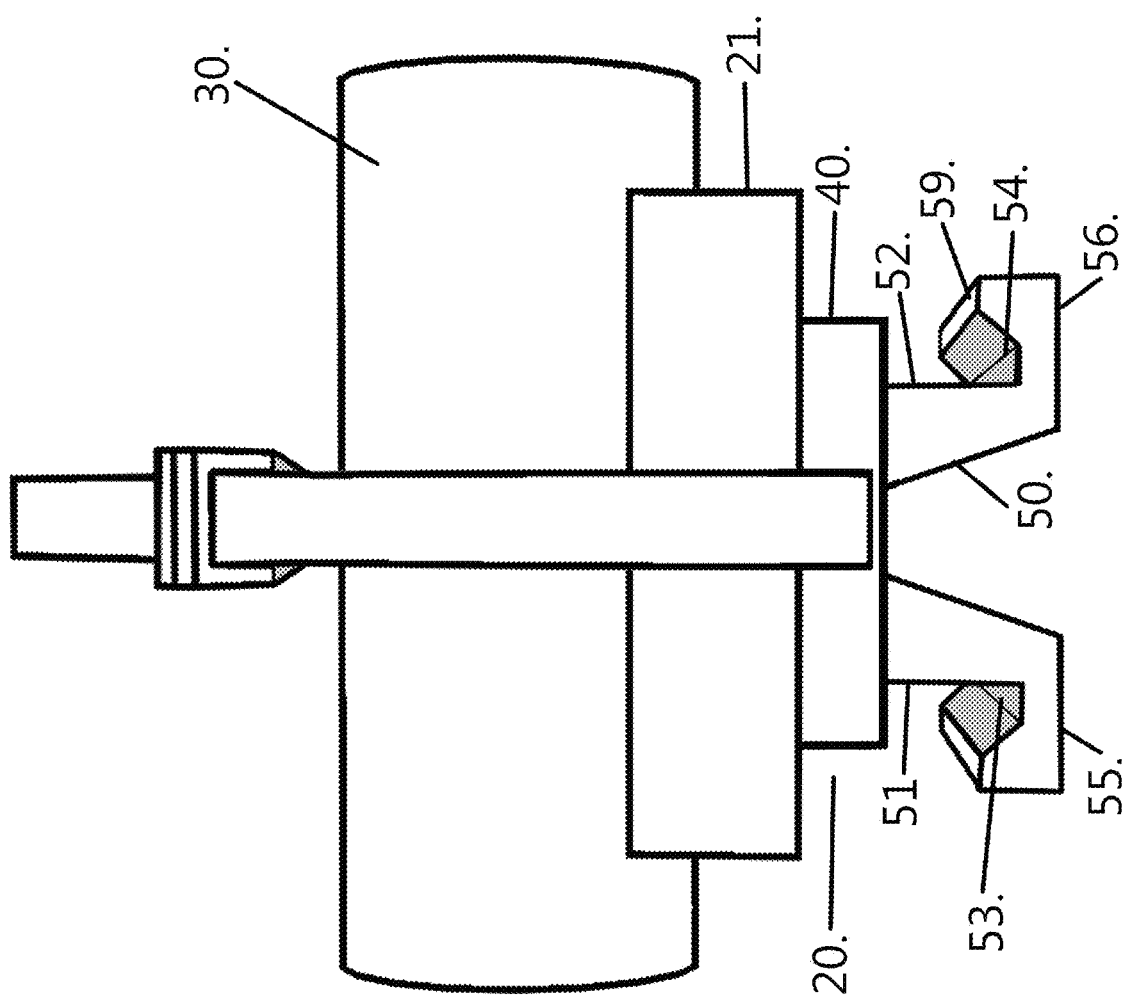
FIG. 9 is a side view of the third embodiment of the connector with U-shaped feet and with a pipe connected.
Figure 10:
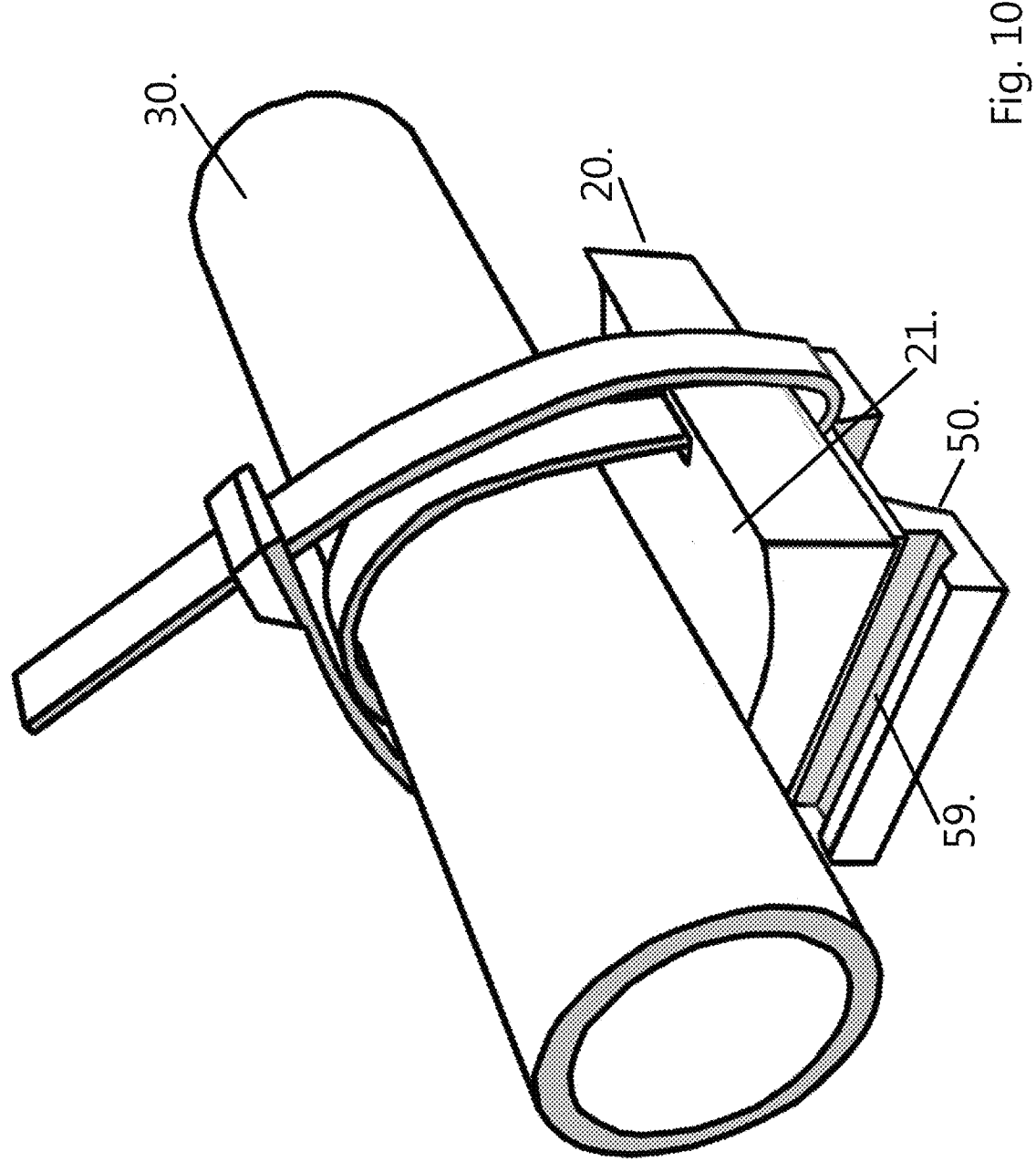
FIG. 10 is an elevated view of the third embodiment without shoulders, U-shaped feet and with a pipe connected.
Figure 11:
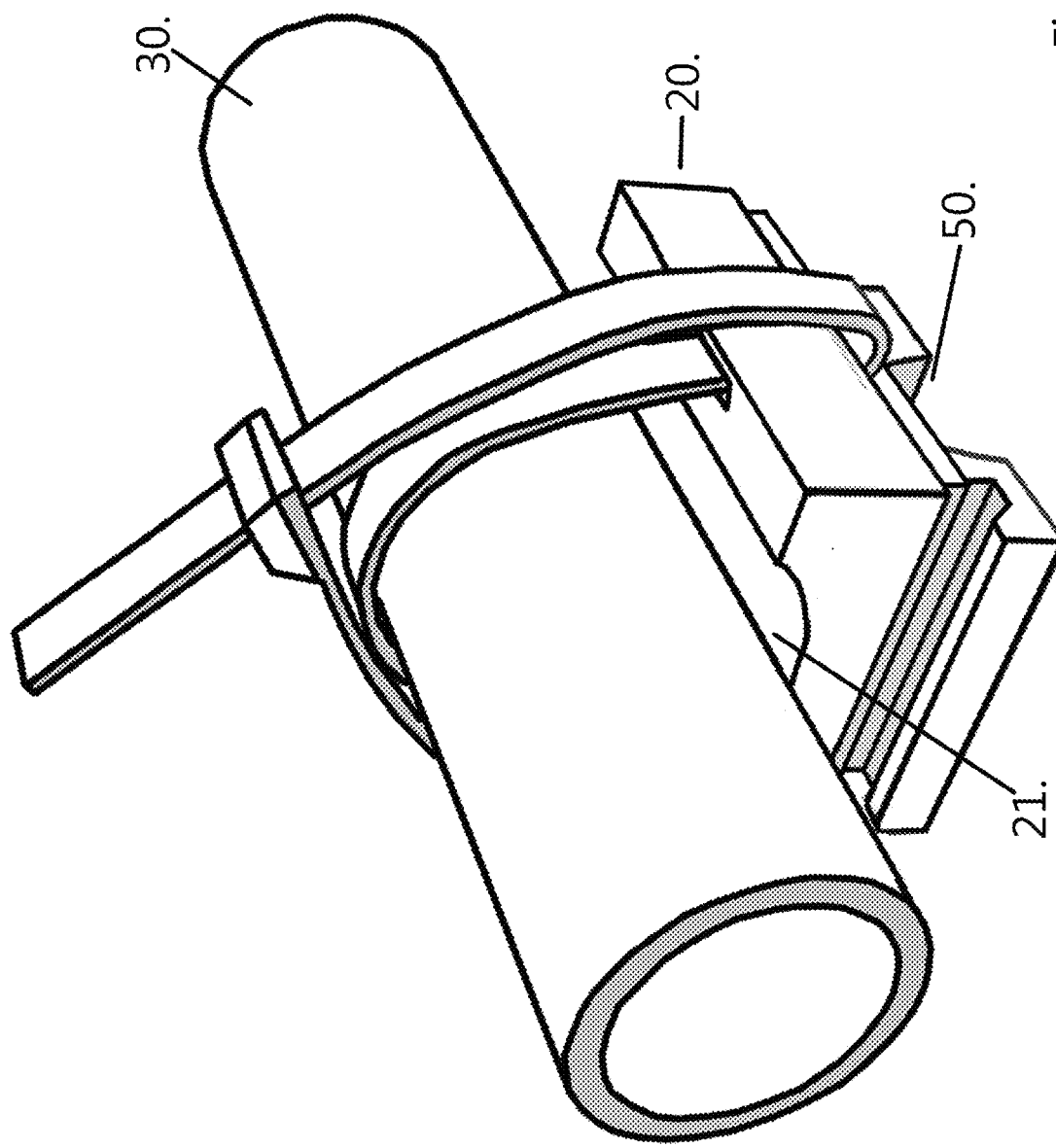
FIG. 11 is an elevated view of the third embodiment with shoulders, with U-shaped feet and with a pipe connected.
Figure 12:
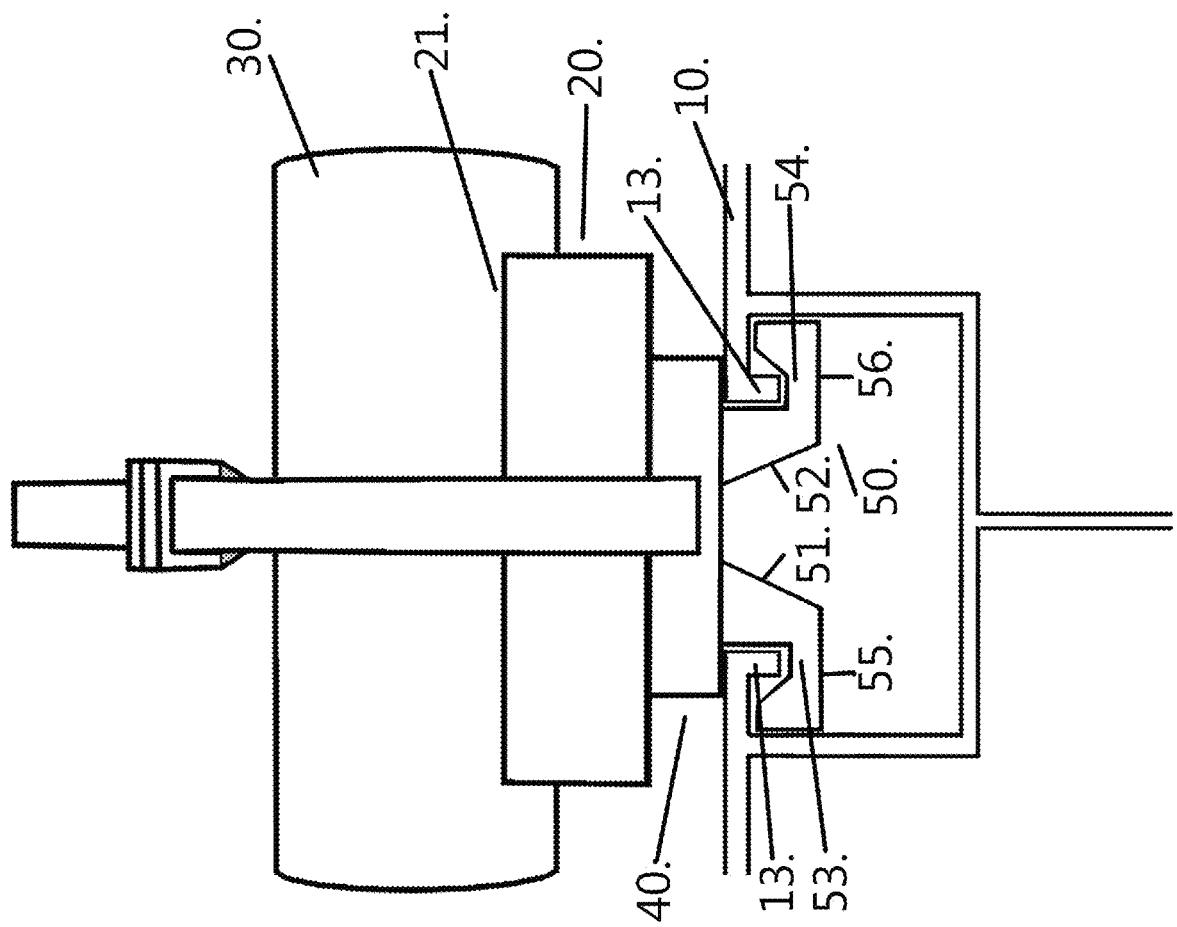
FIG. 12 is a side view of the third embodiment with U-shaped feet when connected to the pipe support with a pipe connected as well.
Figure 13:
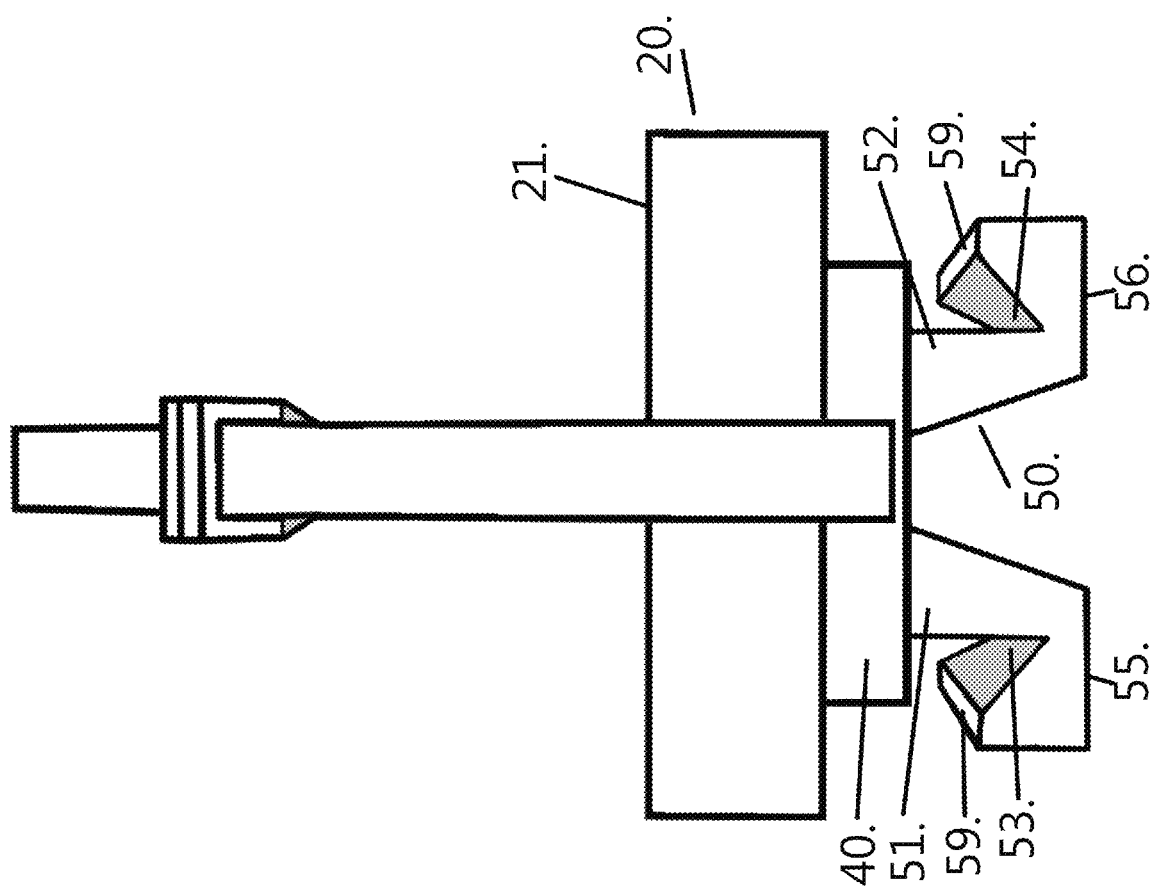
FIG. 13 is a side view of the third embodiment but with V-channel feet.
Figure 14:
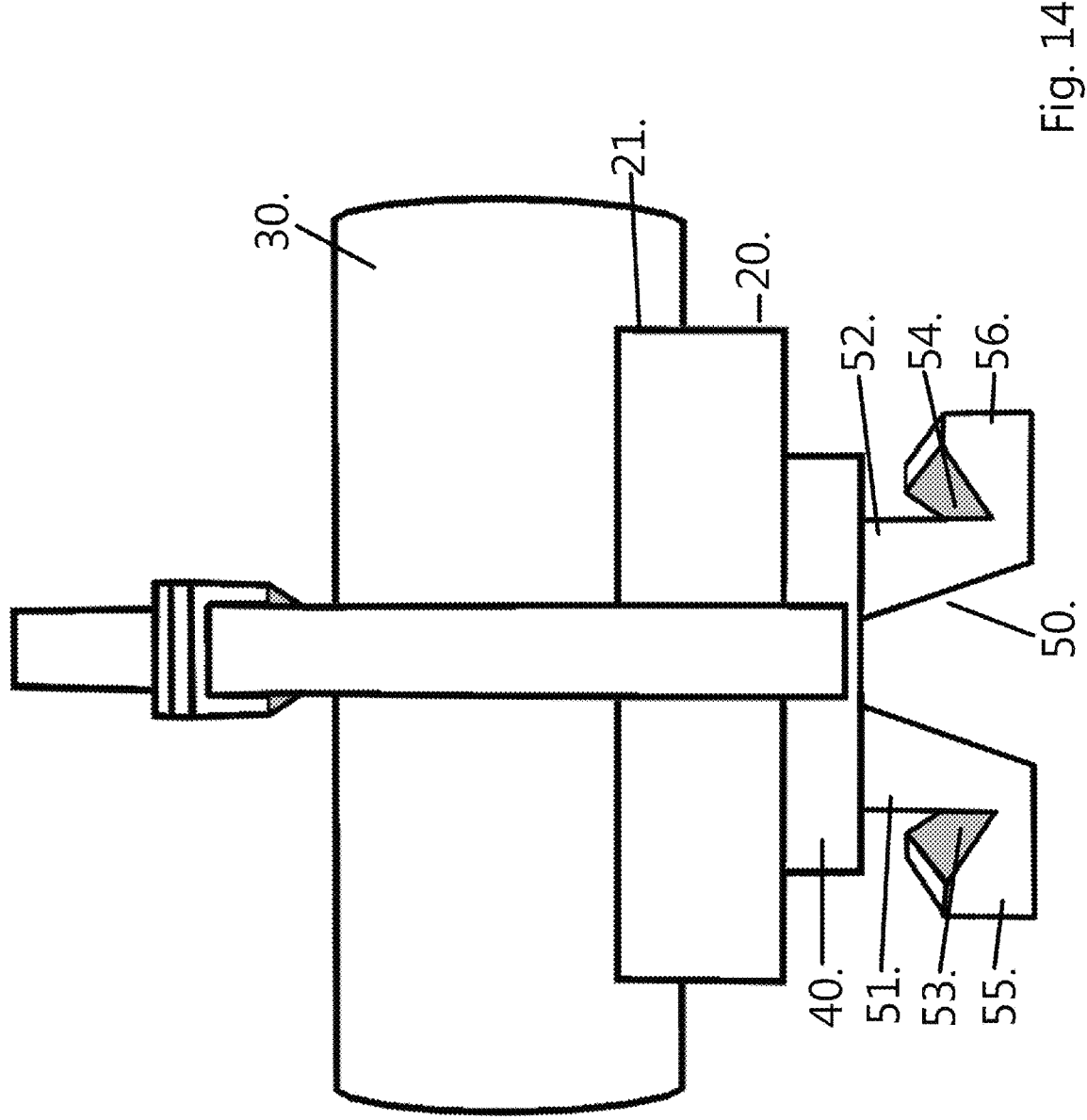
FIG. 14 is a side view of the third embodiment with the V-channel feet and a pipe connected.
Figure 15:
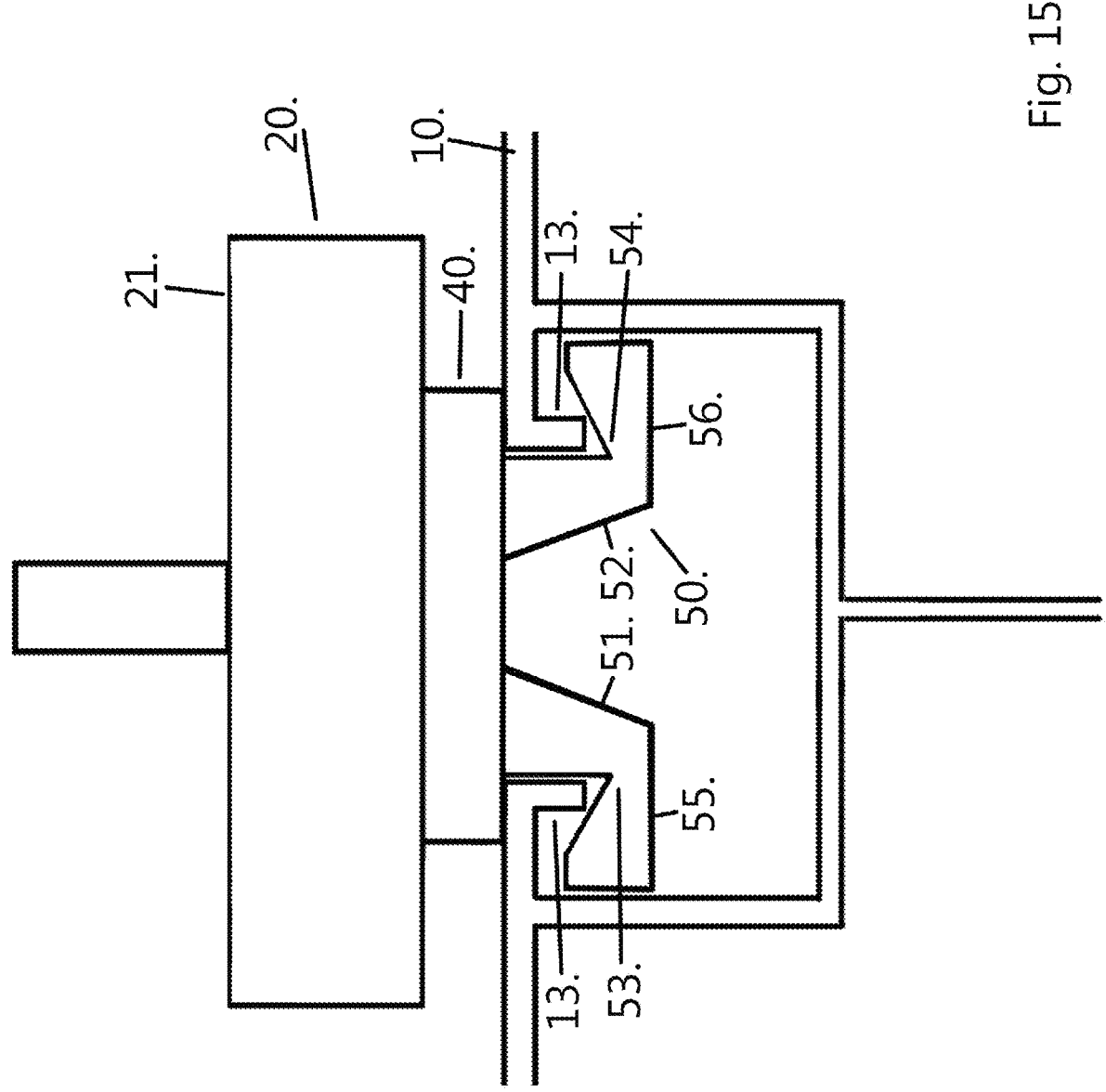
FIG. 15 is a side view of the first embodiment with the V-channel feet connected to the pipe block.
Figure 16:
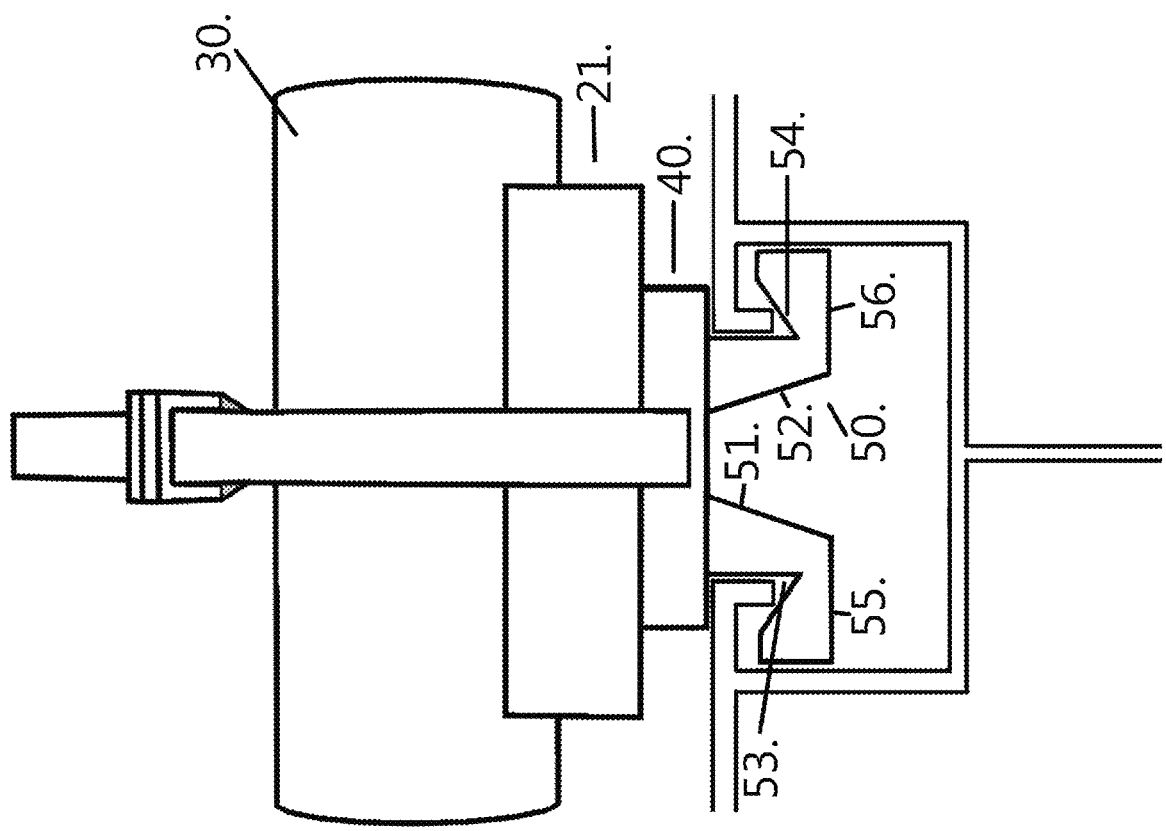
FIG. 16 is a side view of the third embodiment with the V-channel feet connected to the pipe block and a pipe attached thereto.
Figure 17:
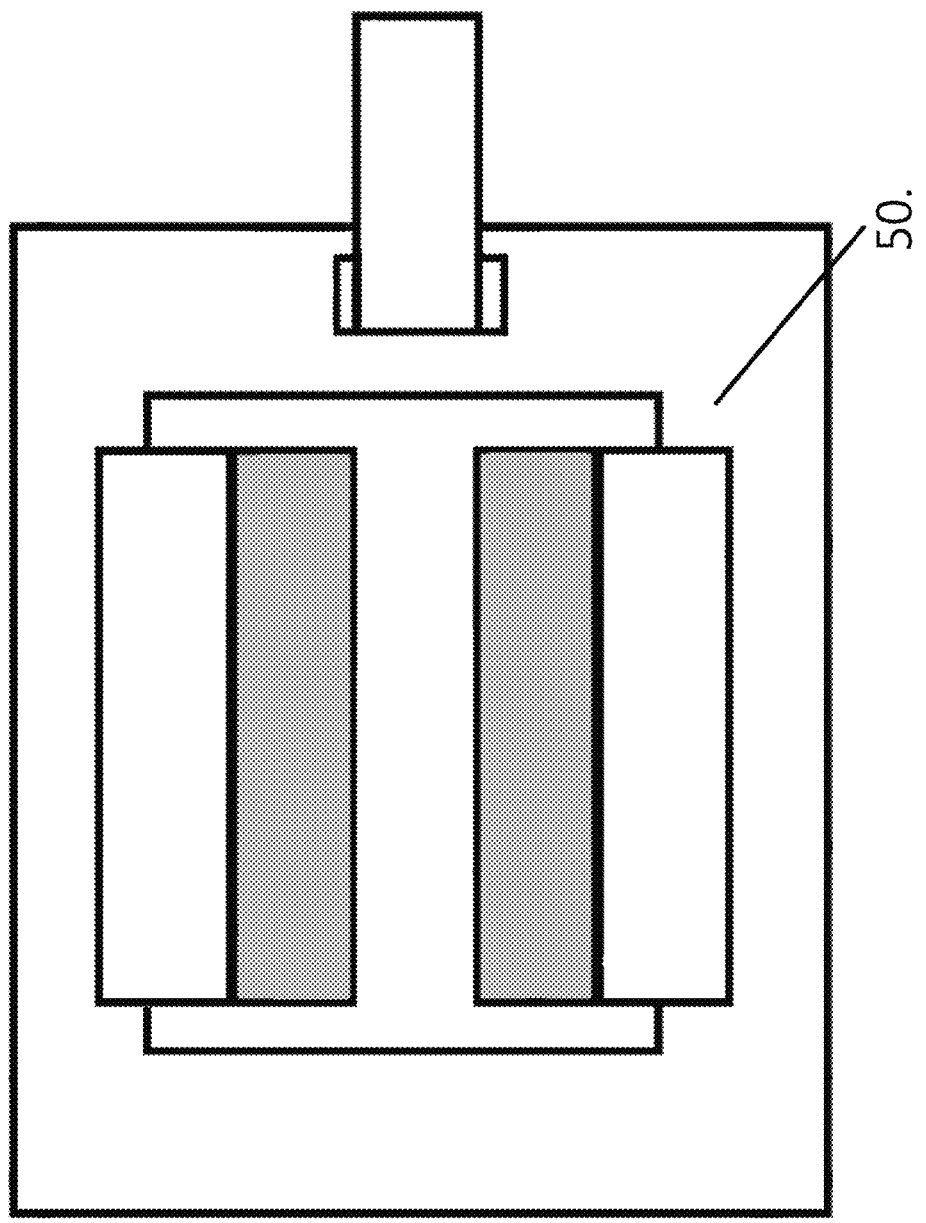
FIG. 17 is a bottom view of the connector with square corners.
Figure 18:
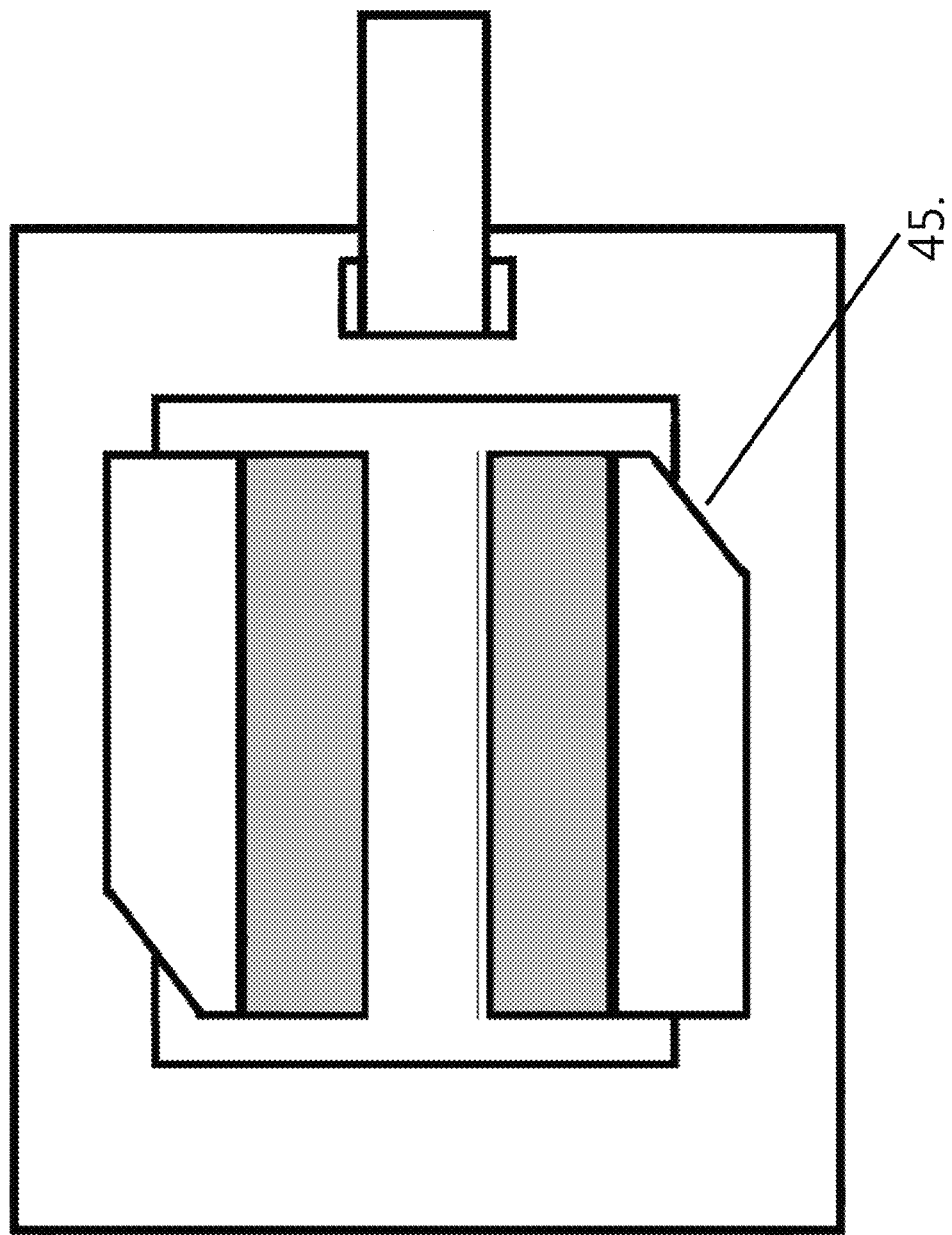
FIG. 18 is a bottom view of the connector with 45 degree corners.
Figure 19:
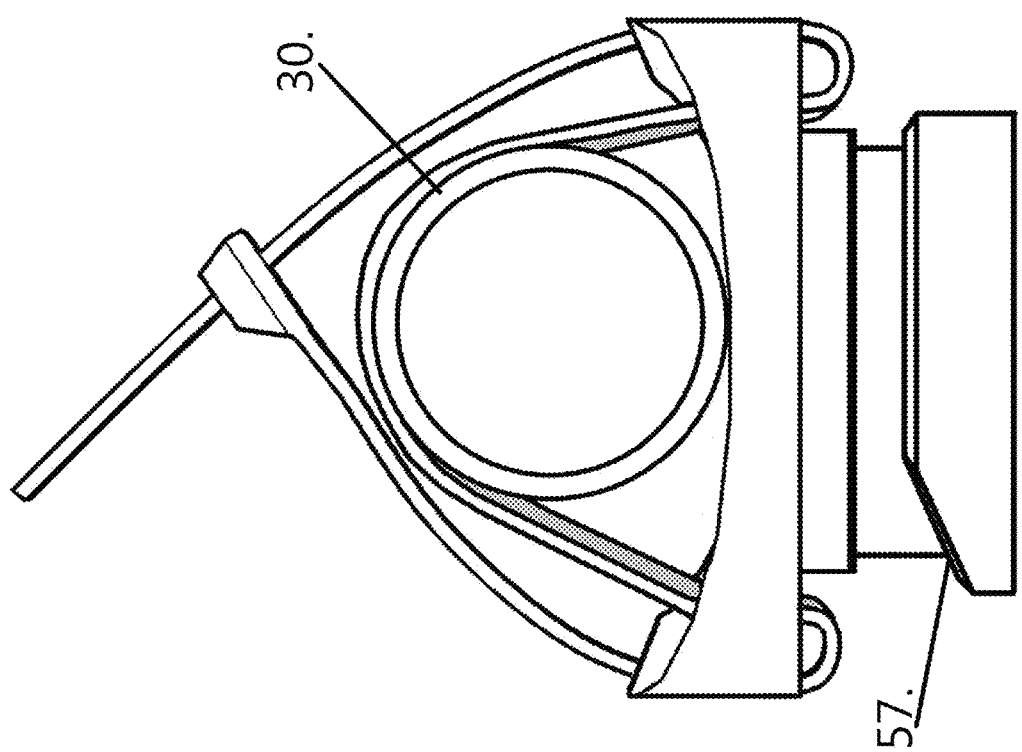
FIG. 19 is a side view of the third embodiment with sloped feet.

Lower portion 50 includes two flexible legs 51, 52. These legs are preferably mirror images of each other and perform the same functions on opposite sides so the description set out hereinbelow applies to both legs equally. The legs 51, 52 extend downward from the middle portion 40 and have an inner side that is slanted and an outer side that is basically perpendicular to middle portion 40. However, the inner side could also be perpendicular to middle portion 40. At the bottom of both legs are feet 55, 56. The feet extend outward from legs 51, 52 and the turn upward. As seen in FIG. 7 the upward portion and the downward leg form U-channels 53, 54 or alternatively, they could form V-channels. Various views of the U-shaped channels can be seen in FIGS. 1 through 12 and various views of the V-shaped channels can be seen in FIGS. 13 through 16. Additionally, each foot can have bevel portions 57, 58 that are located at opposite ends of feet 55, 56, as can be seen in FIG. 19. This unique design provides for easy installability and lockability of the block connector 20 to the pipe block 10. This configuration is only shown in FIG. 19 but can be incorporated into any of the configurations. The method of installing is described next.

First, the distance from the front of the foot to the back of the foot cannot exceed the width of the connector channel 12. This is so the connector, when turned sideways, will fit into the channel 12. FIG. 1 shows the user inserting connector 20 into the channel 12 until the middle portion 40 is resting on the top of the block. Then, the connector is rotated in the direction of the beveled corners 57, 58 and snap locks in place, as described below. FIGS. 8, 12, 15 and 16 show the connector 20 after it is twisted into the locked position. The beveled sides 57, 58 of the connector 20 allow rails 13 to connect easily with the top of the feet on opposite sides and then further allows rails 13 to gradually tighten up until rail 13 reaches the lock point 59 on the top of the feet. After reaching lock point 59 rails 13 slip into V or U-channels 53, 54, thus locking the connector 20 to the block 10. In addition, feet 55, 56 are somewhat flexible in a vertical direction so that when rails 13 contact the bevel and finally the upper portion of the feet the feet will tend to flex downward, allowing rails 13 to continue back until they each reach the lock point 59. When they pass lock point 59 both feet will reflex back into their original position, thus securely locking the connector to the block. It is also noted that when used with a plastic block the rails 13 are also somewhat flexible and so rails will also flex in order to receive the connector therein.

It is to be understood that the order of connection does not matter. That is, the user may first connect to pipe to the connector 20 and then connect the connector 20 to the block 10 or alternatively, the user may first connect the connector 20 to the block 10 and then connect the pipe 30 to the connector 20.

Figure 20:
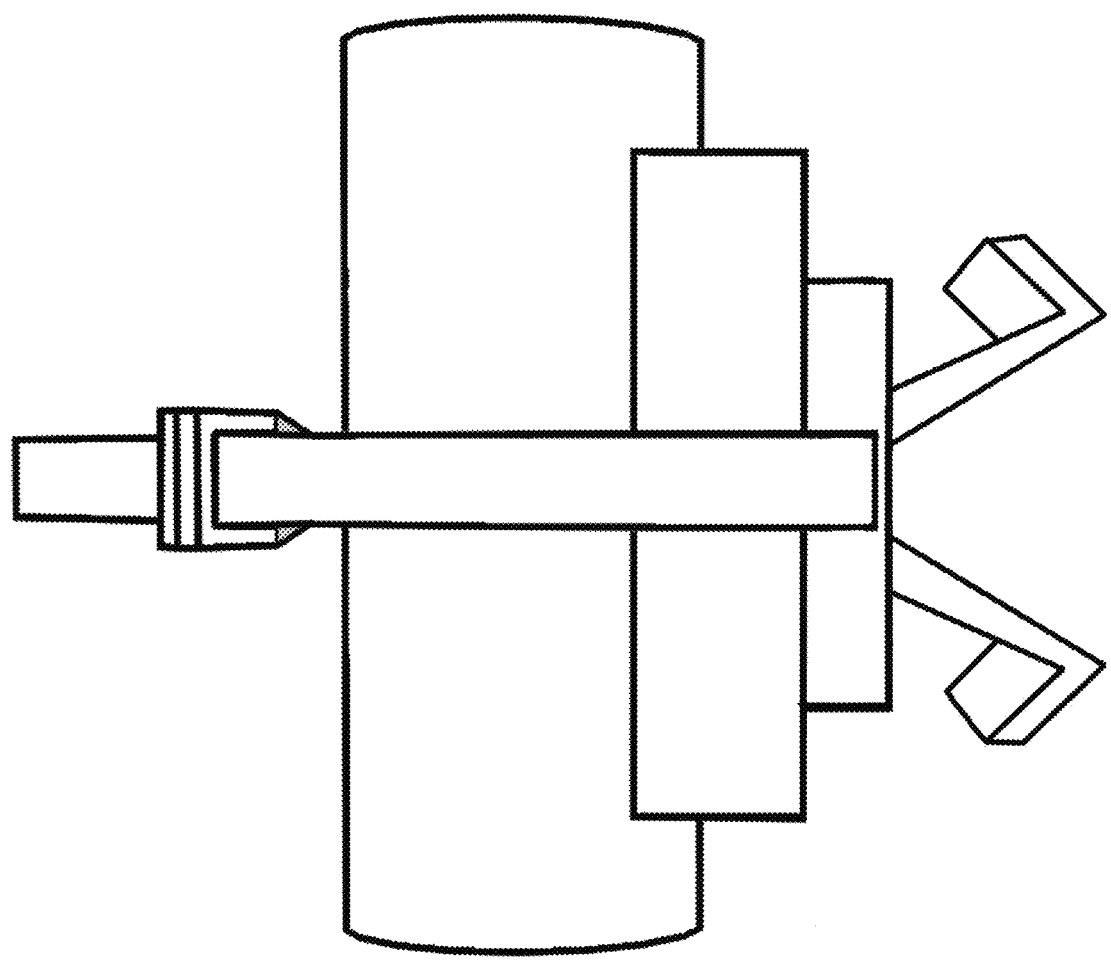
FIG. 20 is a side view of the fourth embodiment with pipe connected to the connector.
Figure 21:
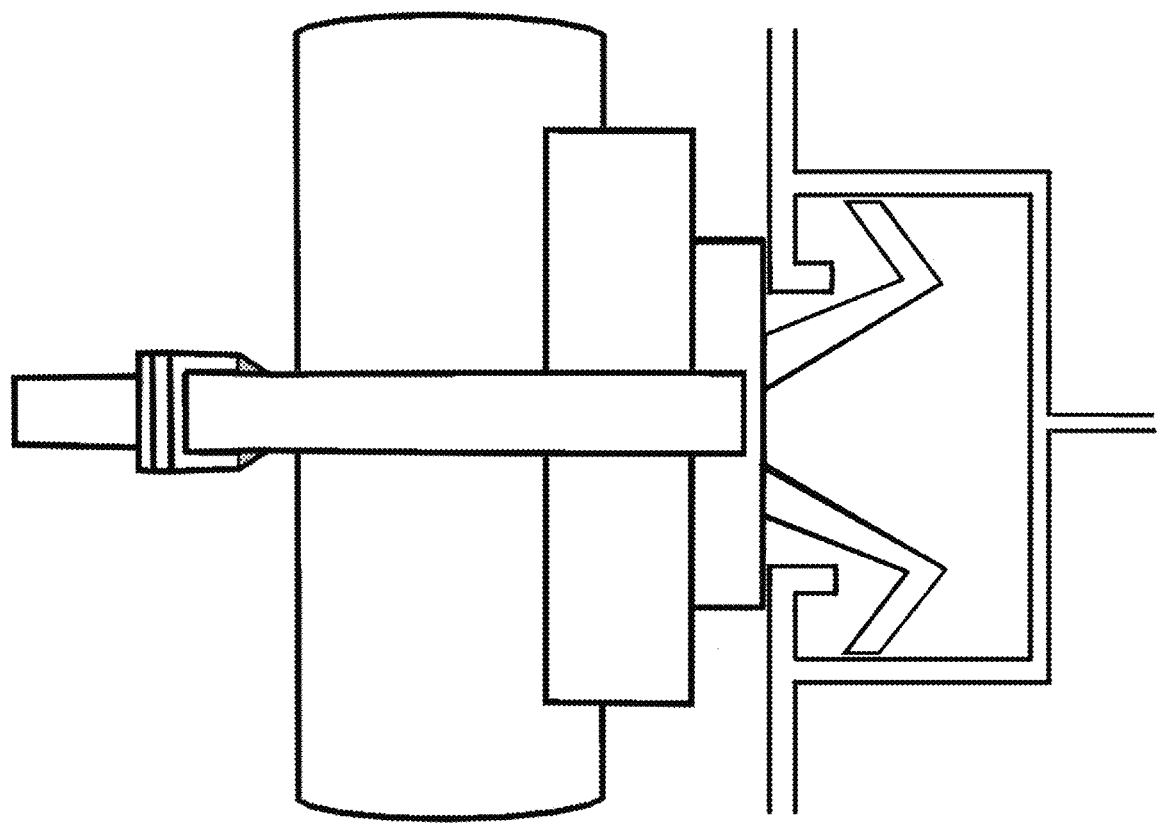
FIG. 21 is a side view of the fourth embodiment when the connector is connected to the pipe support and with a pipe connected.

Still another embodiment is shown in FIGS. 20 and 21. This embodiment is similar to the previously described embodiments but the configuration is such that it is a push and snap lock mechanism. As can be seen from the FIGS. 20 and 21 the legs are designed in a flexible V shape such that they are simply driven down into the channel 12 by forcing them past rails 13. In this manner both the connector legs and the block both flex somewhat so that the connector is snapped into place. Once past the rail and in the channel the legs snap back to their original position, as do rails 13 such that rails 13 are inserted into the V or U-channels, thus securing the connector to the block. The top pipe connector embodiments are the same as previously described.

Although the invention has been described with reference to the preferred embodiments illustrated in the attached drawing figures it is noted that equivalents may be employed and substitutions made herein without departing from the scope of the invention as recited in the claims.

Having thus described the various embodiments of the invention, what is claimed as new and desired to be protected by Letters Patent includes the following:

1. A connector for securing a pipe or conduit to a pipe support where said pipe support has at least one channel and two rails that run parallel to said channel, said connector comprising:
    an upper pipe connector portion having a platform and a
        fastening means for securing said pipe to said platform;
    a lower pipe support connecting portion that is rotatably
        lockable to said support rails having:

at least two legs that are integrally formed with and downwardly extending from said upper pipe connector portion, the at least two legs configured to be perpendicularly aligned with said pipe or conduit held on the connector;

at least two angled feet at a bottom portion of said legs;

at least two channels formed by said angled feet and said legs;

where said lower pipe support connecting portion can be inserted between said rails of said pipe support and into said pipe support channel and is rotatable so that said rails of said pipe support can be inserted into and secured within said channels; and a middle portion located between said upper pipe connector portion and said lower connecting portion that provides both a solid base for said upper pipe connector portion and said pipe and creates gaps at outer edges between said upper pipe connector portion and said pipe support, wherein said upper pipe connector portion overlaps said middle portion.

2. The connector of claim 1 where said fastening means for securing said pipe to said platform further includes:
a strap permanently affixed to a first side of said platform;
at least one hole in a second, opposite side of said platform; and
where said strap is insertable through said at least one hole in said opposite side and lockable therewith.

3. The connector of claim 2 where said first and said second sides of said platform have shoulders.

4. The connector of claim 2 where the strap is a zip tie.

5. The connector of claim 1 where said fastening means for securing said pipe to said platform further includes:
at least one hole in a first side of said platform;
at least one hole in a second, opposite side of said platform;
a strap that is insertable through said at least one hole in said first side and through at least one hole in said second opposite side; and
where one end of said strap is unable to pass through said first hole and where said second opposite side hole has a means to secure another end of said strap.

6. The connector of claim 5 where said first and said second sides of said platform have shoulders.

7. The connector of claim 5 where said strap is a zip tie.

8. The connector of claim 1 where said fastening means for securing said pipe to said platform further includes:
at least one hole in a first side of said platform;
at least one hole in a second, opposite side of said platform; and
a strap that is insertable through said at least one hole in said first side and through at least one hole in said second opposite side; and
where said strap is lockable to itself.

9. The connector of claim 8 where said strap is a zip tie.

10. The connector of claim 1 where said channels formed by said angled feet and said legs are substantially U shaped.

11. The connector of claim 1 where said channels formed by said angled feet and said legs are substantially V shaped.

12. The connector of claim 1 where said upper pipe connector portion platform is trough shaped.

13. The connector of claim 1 where said lower connecting portion further includes a tapered section located at an upper, front portion of one foot and at an upper, rear portion of the second foot.

14. The connector of claim 1 where said legs are semi-rigid.

15. The connector of claim 1 where said angled feet further include a lock point where once said rails are rotated past said lock point they snap into said channels formed by said angled feet and said legs.

16. A method of securing a pipe or conduit to a pipe support using the connector of claim 1 comprising the steps of:
inserting said legs of said connector into said channel of said pipe support;
rotating said connector in said channel so that said rails of said pipe support slide along an upper portion of said legs during rotation;
sliding said rails along said upper portion of said legs until they reach a locking point of said angled feet;
securing said rails within said channels of said angled feet by passing said locking point whereafter said rails drop into and are secured by said channels;
placing said pipe on said pipe platform; and
using said fastening means for securing said pipe to said pipe support.

17. The method securing a pipe or conduit to a pipe support using the method of claim 16 where said fastening means comprises:
a strap with one end permanently affixed on one side of said pipe platform and a second free end; and
at least one hole on the other side of said pipe platform where said strap is lockable within said at least one hole;
and further comprising the steps of:
placing said pipe on said pipe platform;
wrapping said free end of said strap up and over said pipe;
inserting said free end of said strap through said at least one hole;
pulling said strap free end down and through said at least one hole; and
locking said pipe into place on said pipe platform with said strap.

18. The method securing a pipe or conduit to a pipe support using the method of claim 16 where said fastening means includes:
at least one hole on a first side of said pipe platform;
at least one hole on a second side of said platform; and
further comprising the steps of:
inserting a first end of a strap down through said at least one hole on said first side of said pipe platform;
bringing said strap first end back up and wrapping strap up and over said pipe;
inserting said strap first end through said at least one hole on said second side of said pipe platform;
bringing said strap first end back up again and over said pipe; and
locking said strap first end to a second end of said strap.

19. The method securing a pipe or conduit to a pipe support using the method of claim 18 where said strap is a zip tie.

20. A connector for securing a pipe or conduit to a pipe support where said pipe support is flexible plastic and has at least one channel and two plastic rails that run parallel to said channel, said connector comprising:
an upper pipe connector portion that includes:
a platform and a fastening means for securing a pipe to said platform;
a lower connecting portion that is rotatably lockable to said pipe support rails and that includes:
at least two legs that are integrally formed with said upper pipe connector portion, said at least two legs configured to be perpendicularly aligned with said pipe or conduit held on said connector;
at least two angled feet at a bottom portion of said legs;

at least two channels formed by said angled feet and said legs and;

where said lower pipe support connecting portion is inserted between said rails and into said pipe support channel and is rotatable and where said rails of said pipe support are insertable into said channels due to the fact that both said legs and said rails are flexible; and a middle portion located between said upper pipe connector portion and said lower connecting portion that provides both a solid base for said upper pipe connector portion and said pipe and creates gaps at outer edges between said upper pipe connector portion and said pipe support, wherein said upper pipe connector portion overlaps said middle portion.

\* \* \* \* \*